United States Patent [19]
Montgomerie et al.

[11] Patent Number: 6,073,174
[45] Date of Patent: Jun. 6, 2000

[54] REMOTE ACCESS SYSTEMS

[75] Inventors: Alastair Montgomerie, Ipswich; Jeffrey Edward Deslandes, Felixstowe; Robert Malcolm Ball, Ipswich; Dennis John Tricker, Ipswich; Keith Eric Nolde, Ipswich, all of United Kingdom

[73] Assignee: Bristish Telecommunications, London, United Kingdom

[21] Appl. No.: 08/822,132

[22] Filed: Mar. 21, 1997

Related U.S. Application Data

[63] Continuation-in-part of application No. 08/419,011, Apr. 7, 1995, abandoned, and a continuation of application No. PCT/GB95/02301, Sep. 27, 1995.

[30] Foreign Application Priority Data

Sep. 27, 1994 [EP] European Pat. Off. ............ 94307055

[51] Int. Cl.[7] ............................ G06F 13/35; G06F 15/17
[52] U.S. Cl. ...................................... 709/224; 379/106.03
[58] Field of Search ..................................... 709/217, 223, 709/224, 229, 238, 244; 340/825.54, 825.55, 870.02, 870.03; 379/102.07, 106.03, 106.07, 106.11

[56] References Cited

U.S. PATENT DOCUMENTS

| | | | |
|---|---|---|---|
| 3,266,018 | 8/1966 | Higgins | 340/870.02 |
| 3,899,774 | 8/1975 | Binnie et al. | 340/825.54 |
| 4,025,905 | 5/1977 | Gorgens . | |
| 4,135,181 | 1/1979 | Bogacki et al. | 340/825.06 |
| 4,225,918 | 9/1980 | Beadle et al. . | |
| 4,353,502 | 10/1982 | Myers | 340/825.06 |
| 4,504,831 | 3/1985 | Jahr et al. . | |
| 4,707,852 | 11/1987 | Jahr et al. . | |
| 4,713,837 | 12/1987 | Gordon . | |
| 4,783,748 | 11/1988 | Swarztrauber et al. | 340/825.08 |
| 4,811,011 | 3/1989 | Sollinger | 340/870.02 |
| 4,864,274 | 9/1989 | Black . | |
| 5,053,766 | 10/1991 | Ruiz-del-Portal et al. | 340/370.02 |
| 5,155,481 | 10/1992 | Brennan, Jr. et al. | 340/870.02 |
| 5,287,461 | 2/1994 | Moore . | |
| 5,311,581 | 5/1994 | Merriam et al. | 379/106.07 |
| 5,323,448 | 6/1994 | Biggs . | |
| 5,570,411 | 10/1996 | Sicher . | |

FOREIGN PATENT DOCUMENTS

| | | |
|---|---|---|
| 0474407 | 3/1992 | European Pat. Off. . |
| 2262682 | 6/1993 | United Kingdom . |
| WOA9115074 | 10/1991 | WIPO . |

*Primary Examiner*—Mark H. Rinehart
*Attorney, Agent, or Firm*—Nixon & Vanderhye P.C.

[57] ABSTRACT

A management system provides a remote access service to units of equipment at distributed locations of a communications network. For instance, it can provide automatic meter reading over a PSTN for utility companies. The management system initiates calls over the network to selected units, usually pre-determined, in response to call requests, and can provide considerable functionality such as authentication and batch processing of the request. Conflict with ordinary traffic on the network can be avoided by monitoring for ordinary traffic calls and clearing down any existing conflicting remote access calls or blocking any requested potentially conflicting remote access calls. Uncompleted or blocked remote access calls are automatically re-scheduled by the management system.

48 Claims, 9 Drawing Sheets

REMOTE ACCESS SYSTEMS

RELATED APPLICATION

This is a continuation-in-part of our commonly assigned U.S. application Ser. No. 08/419,011, filed Apr. 7, 1995, abandoned, and a continuation of our co-pending application PCT/GB95/02301 filed Sep. 27, 1995 designating the United States.

BACKGROUND OF THE INVENTION

1. Field of the Invention

The present invention relates to remote access for distributed equipment, and particularly, but not exclusively, to telemetry and telemetry systems.

2. Related Art

The cost to utility companies, such as gas, electricity and water suppliers, of manually reading meters is substantial. Consequently, meters are read infrequently and householders frequently receive estimated accounts rather than those based on actual consumption. Further difficulty can arise when meter readers are unable to obtain access to meters.

These problems can be overcome by remote meter reading using telemetry. Telemetry is a remote access process whereby meters are connected to a communications network and can be accessed and read over the network typically from a single location, for example at premises owned by a utility. The process of reading the meters is typically carried out by a suitable computer system connected to the network by a modem and running appropriate communications and data retrieval software.

There is also a growing demand for telemetry from organisations other than the utilities such as, for example, independent meter-reading agencies and businesses with dispersed sites wishing to meter their own energy usage.

Although remote access systems, including telemetry systems, are desirable, the high capital cost for a company of installing a communications network for instance just to read utility meters, particularly retrospectively, may not be justified.

Thus, the Applicants, in making the present invention, have seen advantages in creating a remote access infrastructure which can serve a wide range of companies and markets, including energy usage measurement.

SUMMARY OF THE INVENTION

In accordance with a first aspect of the present invention, there is provided a remote access management system for managing communication with distributed target equipment over a communications network, said system comprising:

means for receiving a request for an access operation to selected target equipment;

means for providing routing information for target equipment identified by said request, said routing information including, for each of at least some pieces of target equipment, a communication network line termination address and a port number of an interface means having a plurality of ports, each of said at least some pieces of target equipment being connected to the network via a port of an interface means and being thereby individually accessible by specifying a respective interface address and a respective port number in the routing information;

means for providing equipment-specific access requirements in dependence upon the type of the selected target equipment;

means for initiating an access operation to said target equipment, said means including means arranged to transmit control information, including said routing information and said equipment access requirements, to a communications network platform arranged to receive said control information and operate said access operation over a communications network;

means for receiving and storing data from said network platform in response to said access operation; and, means for forwarding to the originator of said request data indicative of said stored data.

The access operation results data can then be output automatically or on request, in a format suitable to the circumstances.

In the present specification, and unless otherwise stated, the person or organisation requesting an access operation, for example a utility, will be called "the customer", or the request originator, and the person or organisation to whose equipment the operation is directed will be called "the target". This reflects the fact that it is likely to be the person or organisation requesting access who will be responsible for the costs at first instance.

The applicants believe that there are also markets for non-energy applications for telemetry. Such markets, for example, may include: stock monitoring, eg in vending machines, petrol stations, and bulk storage tanks; and, environmental monitoring, eg temperature, water, purity, or pollen count.

As well as "telemetry", there might be other remote access operations which could use similar principles, such as, for example, billing utility customers directly to avoid using the postal service, remote control of heating systems and other electrical equipment, and other remote automation and control applications, for example energy management, etc.

Communications companies have existing networks that necessarily take into account security and quality, often with high levels of coverage into the relevant customer base. They therefore offer a potentially useful infrastructure with high-quality, high-security data transfer.

In embodiments of the present invention, the remote access system can be provided by the communications network operator, or by an independent entity, and not necessarily by a customer such as a utility. Advantageously, the customer does not then need to know the routing information, for example a directory number (DN), necessary to initiate a remote access call to target equipment since this information is provided by the remote access management system. This means that, for example, where the communications network is a public switched telephone network (PSTN), ex-directory telephone numbers need not be made available to the customer.

Where the communications network is a PSTN, this potentially gives extremely wide access to equipment with which remote access operations might be recognised. Alternatively, the network could be any other suitable type of communications network, for example a packet switched data network.

The initiating means is preferably arranged to provide control information which includes an indication of the type of communications operation to be initiated with the target equipment.

A communications operation preferably can be either substantially a read operation or substantially a write operation. A read operation involves reading information from target equipment, although the setting-up of the read operation does involve sending some controlling information to the target equipment.

Similarly, the write operation involves sending information to the target equipment, although status information will typically be returned to indicate whether the write operation was successful or not.

The remote access management system preferably comprises means for validating requests, the requests including data identifying the originator of the request and the validating means including means to compare the identity of the request originator with a stored set of valid request originators. Preferably, the rights of request originators to access equipment identified in the request can be checked against respective information stored with respect to the system. Thus, the remote access management system operator can maintain control over which customers have access to the system, and to which target equipment each customer has access.

In preferred embodiments, the remote access management system includes a stored set of unique references, where each of the references corresponds to one or more pieces of target equipment. A valid request typically includes at least one reference which matches one of the stored references. Obviously, therefore, customers making requests need to be aware of their valid references. An advantage of this arrangement is that a customer can request access to multiple pieces of target equipment with a single equipment reference in a single request.

The remote access management system preferably comprises timed trigger means for triggering the initiating means to initiate calls to target equipment at pre-selected intervals or times. In this way, customers can be supplied with, for example, meter readings for all their target meters at regular intervals, with the minimum of effort on the part of the customer.

Advantageously, the remote access system has facility to initiate one or more calls on demand. This facility enables, for example, a customer to check a single meter reading on demand.

In preferred embodiments, the remote access management system further comprises up-datable database means containing information including network addresses of all potential target connections accessible over the communications network and the physical locations of said network addresses. This information is particularly useful for establishing lists of targets which would be accessible by the system when suitable target equipment is installed.

Preferably, the remote access management system comprises up-datable database means containing for each piece of target equipment accessible by said system information including the type of each piece of the target equipment and respective data communications access requirements for said target equipment.

This information forms part of the control information which passes to the communications network platform and is essential when different types of target equipment can be accessed by the system and the access requirements of the system are not provided by the customer in a request. An arrangement of this type minimises the amount of information which needs to be known by customers.

As has been stated, multiple pieces of target equipment can be connected to one interface means and can be accessed individually. Other advantages of decoupling the interface means from the target equipment in this way, include:- separation of data collection from the actual target equipment; facilitating the establishment of third-party meter reading agencies who may own the interface means, leaving the suppliers to own, for example, the meters; and providing flexibility, for example an interface means can be changed or upgraded without the need for recertification of meters.

In accordance with a second aspect, the present invention provides a remote access system for communicating with distributed target equipment over a communications network, said system comprising a remote access management system as described above and a communications network platform comprising:

means to receive control information, including target equipment routing information, from said remote access management system;

means to establish access with said target equipment and to receive data, in response to said access, from said target equipment; and means to return at least some of said received data to said remote access management system.

In many applications of embodiments of the present invention, it may be important that normal telephony is substantially undisturbed. Therefore, for instance in telemetry, one aspect of the present invention may be to ensure that a telephone call always takes precedence over a telemetry call. Therefore, a telemetry call will, preferably, clear down if an adjacent telephone (or other communications equipment) goes off-hook, and also an incoming telephony call will be put through over an on-going telemetry call. This aspect of the present invention is discussed in more detail in the Applicants' co-pending application number EP94302620.3. However, in the case of some access operations, for example turning an oven off, it may be preferable for the remote access operation to take precedence over telephone calls.

In embodiments of the present invention, it is likely that the target equipment, or an interface means to which the target equipment is connected, co-terminates a line in the communications network with other communications equipment, for example a telephone or a facsimile. It may then be preferable that the call to the target equipment is a no-ring call (NRC). In this way, the call does not cause, for example, a telephone co-terminated with the target equipment or interface to ring. The whole operation is therefore transparent to customers at target sites.

The means to establish the access with the target equipment preferably includes means to schedule calls to target equipment. Thus, a request which comprises one or more lists of references to target equipment to be accessed, received from the management system, can take place at non-peak periods for the relevant communications network, for example during the night with regard to a PSTN, and any results can be delivered back to the customer in a single communication after the whole process is complete.

In preferred embodiments, the remote access system further comprises means for billing customers. In the case of remote meter reading, it is probable that a utility would be the customer and, hence, would be billed for the relevant data transfer operation. On the other hand, in the case of remote control operation or stock monitoring, for example, the owner of the target equipment is likely also to be the customer and, hence, would be billed. Preferably, customers are billed on a per successful operation basis rather than on communication network connection time. This has the advantage that costs to customers are easily predictable and customers do not get billed for failed operations (which might actually incur some communication network connection time).

In practice, the remote access system preferably provides further functionality. For example, the management system may further comprise means for converting a non-standard customer request format to a format readable by the request processing means. In this way, additional customers may be enrolled without needing to modify, or even replace, their existing systems. The means for converting could be for instance a software filter which simply reads the customer request, and re-formats it to the format required by the request processing means. The means for converting could be part of the management system per se, or it could be part of a customer system which is arranged to interface with the management system during request operations.

The remote access system may further provide means for detecting fraudulent behaviour, for example, by detecting if there is an attempt to credit a utility meter using telemetry by someone who is not authorised to do so. Also, the system may include means for detecting leaks in utility supply, for example, by recognising when meter readings rise at times when they should not.

In accordance with a third aspect of the present invention, there is provided a remote access management system for controlling communications between customers and distributed target equipment over a communications network, said system comprising:

means for managing communications with a customer;

means for managing communications with communications equipment in the communications network, whereby communications with target equipment can be managed;

means for storing data received from either the customer or the communications equipment; and means for forwarding data representative to data stored by said means for storing to either said customer or said communications equipment.

In preferred embodiments of the invention, the remote access management system is arranged to receive data from said communications equipment, store said data, and forward data representative of said stored data to a customer.

Other preferred embodiments of this aspect encompass any or all of the embodiments described above relating to the other aspects of the invention.

Preferably, remote access may be initiated by target equipment instead of, or as well as, by the customer. Remote access may then be initiated by the target equipment to the customer or other designated destination.

Examples of circumstances in which it might be beneficial to have a bi-directional target equipment access capability are for vending machines to indicate when they are near empty and for fuel storage facilities to indicate when fuel reserves are low. Such information may be communicated back to the customer. Also, in more serious situations, for example as a result of on-going vandalism of customer equipment or failed refrigeration in a large food storage premises, where a faster response would be desirable, a target equipment-initiated remote access might automatically trigger an alert being sent to the police, or to an engineer via, for example, a radio pager.

BRIEF DESCRIPTION OF THE DRAWINGS

The present invention will now be described, by way of example only, with reference to the following diagrams, of which.

DETAILED DESCRIPTION OF THE EXEMPLARY EMBODIMENTS

The following description covers a telemetry system which operates over a PSTN, in which, typically, the target equipment comprises consumer meters, each of which co-terminates a telephone line with other communications equipment, for example a telephone. It is assumed that the telemetry system is owned/managed by the PSTN operator, and that the customers are utilities who require remote meter reading operations for the consumer meters.

Figure 1:
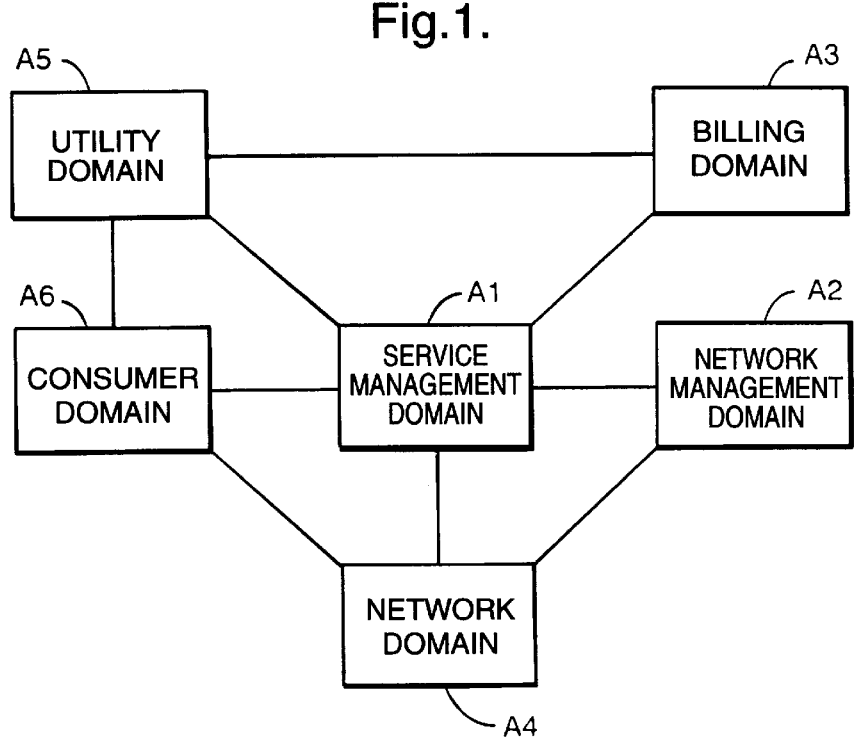
FIG. 1 represents a logical architecture for a telemetry system, showing system domains and relationships between the domains.

FIG. 1 shows a schematic, overall architecture for a telemetry system suitable for automatic meter reading (AMR) operations over a PSTN. The architecture has six domains, these being as follows. A service management domain A1 contains systems and functionality to support interaction between the utilities, the consumers and the network operator. A network management domain A2 contains systems and functionality to provide network and element management for telemetry. A billing domain A3 contains systems and functionality to provide billing and log information to the utilities. A network domain A4 contains all network speech transmission paths and telemetry call initiation equipment. Utilities which require AMR operations are represented by the a utility domain A5, and the consumers are represented by a consumer domain A6. The lines adjoining the domains represent relationships which exist between domains. The following description deals in turn with each domain, and the view each domain has of its relationships to the other domains.

Service Management View

Figure 2:
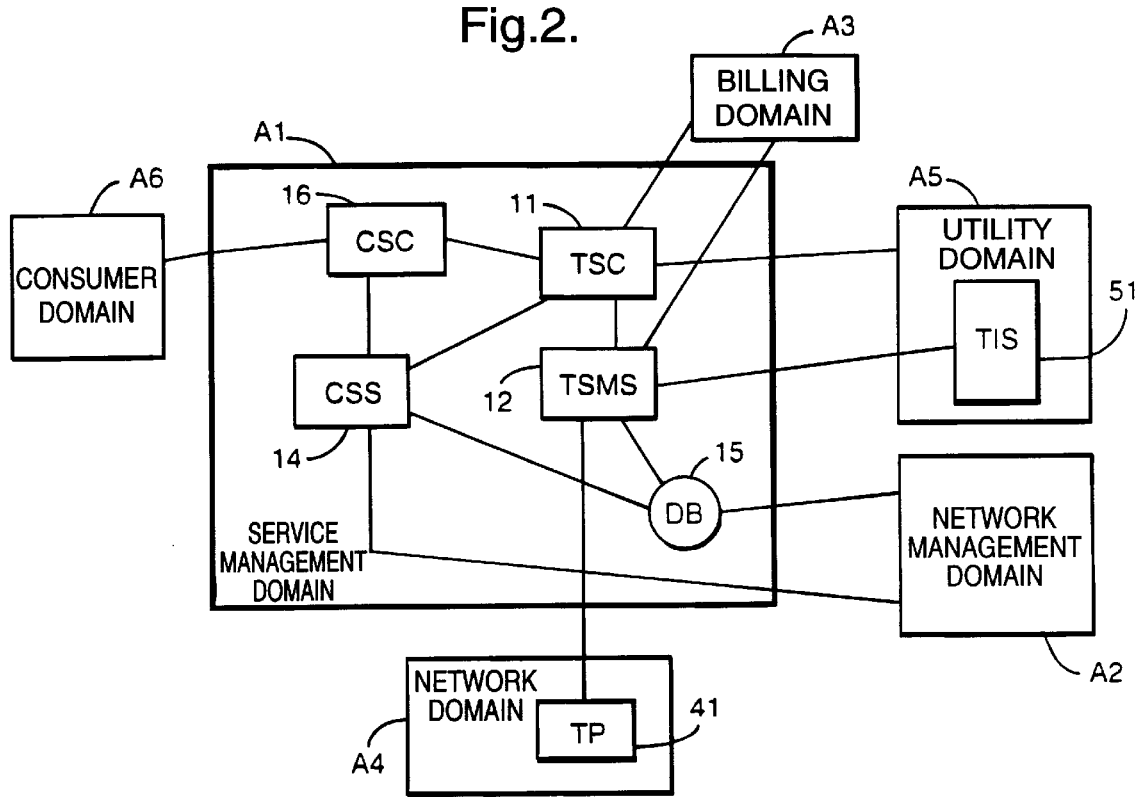
FIGS. 2 to 7 represent the views which each system domain has in the logical architecture, with respect to the other system domains.

The service management view in FIG. 2 shows the architecture from the perspective of the service management domain A1. According to FIG. 2, the service management domain A1 comprises a telemetry service centre (TSC) 11, a telemetry service management system (TSMS) 12, a consumer service system (CSS) 14, a consumer service centre (CSC) 16 and a pre-process database (DB) 15.

The TSC 11 is the primary contact point for utilities for queries or fault reporting. The TSC 11 has access into the TSMS 12, the CSS 14 and the billing domain A3, whereby a utility can contact a TSC operator with a query, and the operator can attempt to answer the query. Any query which highlights a telemetry fault or a network fault, which cannot be dealt with by the operator, is passed to a respective technical division to be dealt with. Consumers are also able to log queries or faults to the TSC 11 via the CSC 16.

The TSC 11 has access to call logs held on the TSMS 12, and also access to a telemetry platform (TP) 41 (described in more detail below in the 'Network View') in the network domain A4, via the TSMS 12, with which it is able to monitor AMR progress which can be reported back to the utility domain A5, if required.

The TSMS 12, is responsible for processing AMR requests from the utility and for utility enrollment, consumer list registration and consumer list updating. The TSMS 12 is also responsible for supplying information to the billing domain A3 for billing purposes.

As well as a consumer list, the basic information which needs to be provided for utility enrollment includes:

utility ID/name, for the utility to be able to identify itself for an AMR service;

a telemetry reference number, which is an identifier common to the PSTN operator and the utility which uniquely identifies the telemetry interface unit (TIU)/meter address to both parties;

a meter reference number, which is the key data component which the utility uses to identify their consumer for AMR service, which is unique to a utility;

a meter address, which is used as a cross-reference to check that the requested meter corresponds to the telephone number and address for a consumer held by the PSTN operator;

a TIU type, which defines the protocol used to access the TIU; and a TIU address/port number, which consists of the unique identification for the TIU and the port number where the meter is connected to the TIU.

Figure 2A:
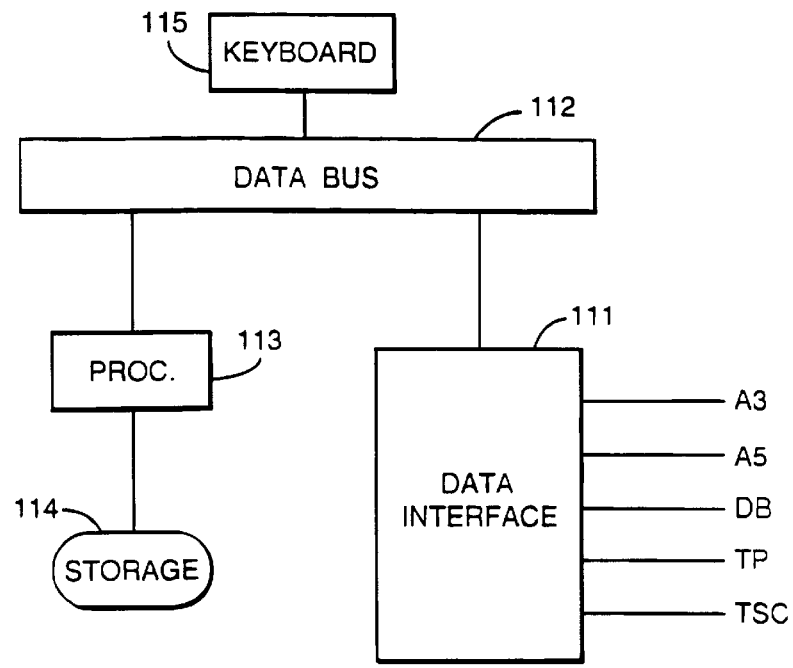

According to FIG. 2A, the TSMS 12 comprises a data interface 111 for connecting the TSMS 12 with other components of the architecture, a programmable processor 113 connected to the interface 111 via a data bus 112, and a storage device 114 connected to the programmable processor 113. A suitable programmable processor 113 is a SUN Microsystems, SPARCStation 1000, or a similar high power, RISC based processor, running appropriate software written in a suitable software programming language such as C++. The interface 111 provides line connections between to the billing domain A3, the utility domain A5, the DB 15, the TP 41 and the TSC 11. The interface 112 is connected to the programmable processor 113 over the data bus 112. The interface 111 receives transmissions to the TSMS 12 and codes the transmissions to identify their origin to the programmable processor 113. Likewise, the interface 111 also sends transmissions from the processor 113, by directing them to the correct destinations. A suitable interface 111 is an Ethernet interface having a connection to the data bus 112 and a connection to an Ethernet local area network to which the other components of the architecture are connected.

AMR requests are made to the TSMS 12 from a utility's telemetry interface system (TIS) 51, via the interface 111. A request comprises, a utility ID, a meter reference number, and a meter address for cross-referencing purposes.

The TSMS 12 validates each AMR request from the TIS 51 by checking the access rights a utility has in relation to the meter(s) specified in the request, by cross-referencing each request with a list of all the valid meter addresses held in a database stored on the storage device 114 (where the list was registered by the utility when the utility was originally enrolled, and may have been updated since).

When validated, the TSMS 12 adds directory numbers (DN) to the AMP requests, which numbers it obtains from the CSS 14, via the DB 15. The information is then forwarded to the TP 41. This enables calls to consumers to be set up by the TP 41.

As well as dealing with single AMR requests, the TSMS 12 is able to deal with batch AMR requests in which a utility sends a list of requests for AMR, in one operation, which are stored on the storage device 114. The TSMS 12 then processes the whole list of requests, as described above, and sends the list to the TP 41. The TP schedules the calls to be initiated at a suitable time, typically at a non-peak time for the communications network. When the TP 41 receives all the results of successful, or unsuccessful, AMR, it sends them, en masse, via the TSMS 12, to the utility (this process is discussed in more detail below).

The TSMS 12 is also able to initiate AMRs for predefined lists of consumers (which were supplied by a utility at an earlier date and are stored in the storage device 114). This facility can be instigated by a simple request from a utility, or automatically, whereby the TSMS 12 adds routing information to the requests in the list, and, at regular, predefined intervals, automatically sends the list to the TP 41 which schedules and initiates the AMR calls.

The TSMS 12 keeps call logs on the storage device 114, including a valid readings log and an exceptions log which can be accessed by the TSC 11, or directly by the utility domain A5 via the TIS 51. Direct access by the utility domain A5 makes accessible to the utility up-to-the-minute information on performance and potential billing.

The CSS 14 is a programmable database which holds records of the availability of telemetry services for each telephone line in the PSTN. A suitable programmable database is an IBM compatible personal computer, with hard disk storage for holding the database, and with suitable communications and database software for accepting manually entered information (or electronically transmitted information) and using this information to update the database as required. The database information is provided by the PSTN operator from the network management domain A2. For each available telemetry line, the CSS 14 holds a corresponding DN (also provided by the PSTN operator) and a corresponding meter reference number which is an identifier common to the PSTN operator and the utility, which uniquely identifies a meter/consumer addresses to both parties. The CSS data also includes a flag against each line which supports telemetry. This flag assists in normal line fault repair by indicating to an engineer that an extra piece of CPE may need to be disconnected to fix a fault.

The CSS 14 forwards DN data records to the DB 15, as required, in response to the arrival of new or updated DN data records. The DB 15 also receives details of corresponding telephone exchange access requirements from the network management domain A2. The telephone exchange access details typically include exchange type and required method of call set-up, for example which signalling is required to set up a no-ring call. Thus, when the TSMS 12 receives a valid request, the required DN is retrieved from the DB 15 along with the telephone exchange access details, ready to be sent to the TP 41. The information stored on the CSS and the DB is updated regularly by the network management domain A2 and the utility domain A5 (via the TSC or the TSMS 12).

The CSC 16 is the main contact point for the consumer domain A6. The CSC 16, like the TSC 11, is a human operator with the ability to access the CSS 14 and the TSC 11 for the purposes of receiving fault reports from the consumer domain, entering details of fault reports onto the CSS, and forwarding telemetry faults to the TSC 11 where appropriate. The fault reporting procedures are in common with those commonly adopted for standard communication networks.

Network Management View

The network management role in the telemetry system is similar to the network management role in a standard communications system. The role includes monitoring for and raising alarms, monitoring performance, and varying traffic flow where required, to prevent line overloads or to re-direct traffic around line failures.

Figure 3:
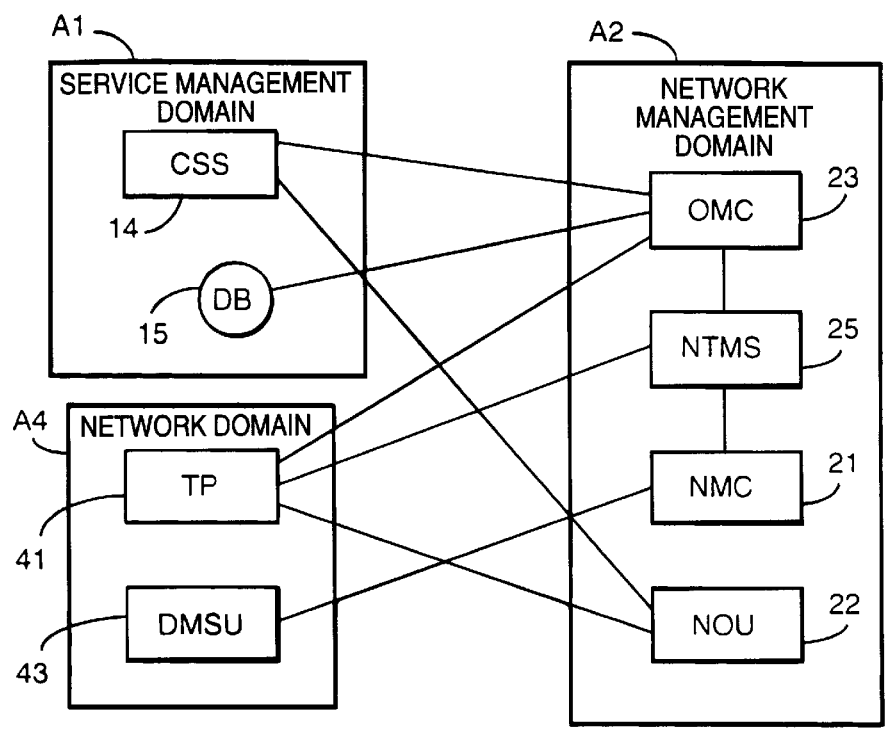

FIG. 3 represents the relationships between the network management domain A2, the service management domain A1 and the network domain A4.

The network management domain A2 comprises components including an operations management centre (OMC) 23, a network traffic management system (NTMS) 25, a network management centre (NMC) 21, and a network operations unit (NOU) 22. Each component comprises one or more computer systems running suitable software, interconnected by known methods.

The NMC 21 handles network traffic in the normal way. However, it is also able to prevent network overloads by reducing the telemetry call rate of the TP 41, if necessary, as well as controlling restoration of control rate.

The NOU 22 receives consumer fault reports from a network CSS which may be resolved in the normal way: any unresolved faults being returned to the TSC 11, via the CSS 14. The NOU 22 also receives alarms raised by the TP 41, in connection with failed call attempts, which again are either dealt with in the normal way or sent to the TSC 11.

The OMC 23 receives requests from the NMC 21 via the NTMS 25 to control the calling rate of the TP 41, and sends controlling signals to the TP 41 to modify the calling rate accordingly.

The NTMS 25 polls the exchanges in the network in the normal way and provides performance data from which network management reports can be compiled. The NTMS also sends control information from the NMC 21 to the OMC relating to call flow modification, and receives from the TP 41 details of calls made by the TP for performance measurement purposes.

Billing View

Figure 4:
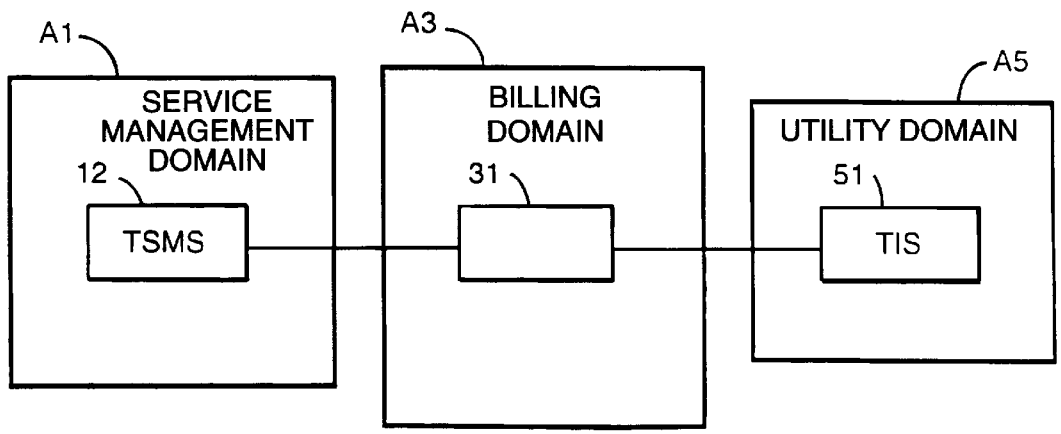

FIG. 4 represents the relationship between the billing domain A3, the service management domain A1 and the utility domain A5.

The billing domain A5 comprises a billing system 31 which receives information from the TSMS 12, which it converts to billing information. The billing information may be passed to the utility as a paper bill, or may be forwarded to the utility electronically, for example by communications line directly into the TIS 51. The billing system comprises a computer system, for example an IBM compatible personal computer, running software for collating the information into itemised bills for each utility. Typical billing information received from the TSMS 12 includes:-date of reading, time of read/write, whether successful or unsuccessful, and utility reference number. The billing system collates the billing information into an itemised bill and initiates the sending of the bill to the utility by computer communications over a suitable link to the TIS 51. The billing criteria in this case is on a per-read operation basis rather than on the basis of network connection time.

Network View

Figure 5:
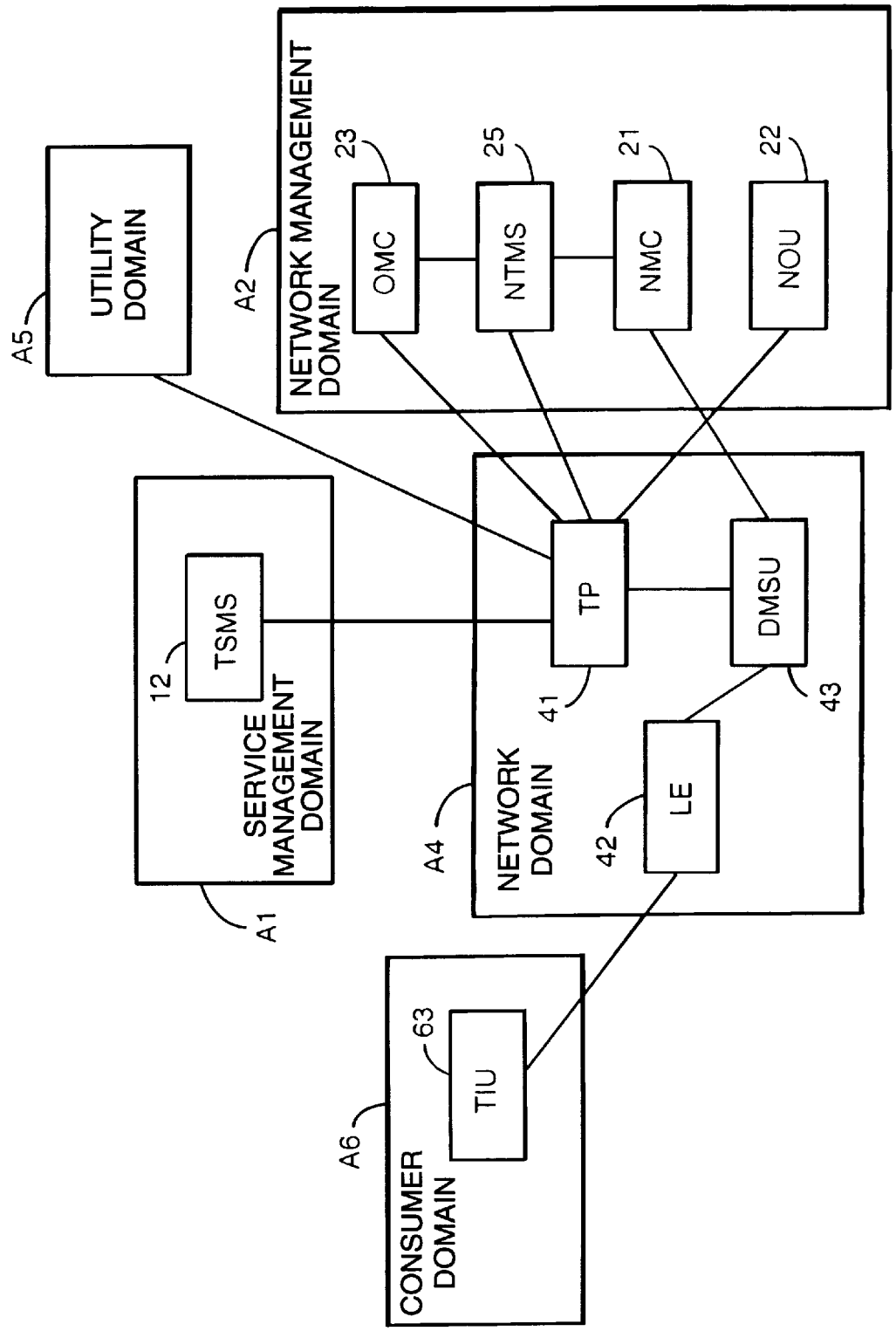

The relationships between the network domain A4 and the service management domain A1, the utility domain A5, the network management domain A2, and the consumer domain A6, are represented in FIG. 5.

The network domain comprises a TP 41, local exchanges (LE) 42 and digital main switching units (DMSU) 43 (only one of each shown). The TP is responsible for accepting AMR requests from the TSMS 12 and initiating an AMR over the communications network. In the case of the communications network being a PSTN, the role of the TP 41 can be carried out by a call processing system. A suitable call processing system is BT's speech applications platform (SAP), which is described in detail in the applicant's co-pending PCT patent application number WO/GB94/01429 filed on Jul. 1, 1994, the contents of which are incorporated herein by reference. The TP 41, which takes call requests from the TSMS 14, sets up calls to a TIU 63 in the consumer domain A6, over a PSTN. The TP 41 is connected into a DMSU 43 in the trunk network of the PSTN, which enables calls to be sent to any TIU connected to the PSTN.

When requested by the TSMS 14, the TP 41 schedules one or more no-ring calls (NRC) to TIUs on the PSTN. The details of how NRCs are established are discussed in detail in the applicants co-pending European patent application number EP94302756.5, the contents of which are incorporated herein by reference. The signalling protocol for managing no-ring calls is the BT variant of the CCITT Signalling System Number 7, commonly known as C7 signalling.

The TP 41 has the facility to re-schedule and re-try failed calls a specified number of times, based on a re-try algorithm. The algorithm re-schedules a failed call for the same night, then for several subsequent nights, and eventually during the day if the call continually fails. All details of successful and failed calls are sent to the TSMS 14 to be logged. Apart from telemetry equipment or network failures, calls fail when a telephone line is busy for other reasons, for example a telephone line is engaged. The TP 41 is designed so that if a telemetry call is in progress when an incoming or outgoing telephone call is attempted, the telemetry call is cleared down immediately in favour of the telephone call. This form of call prioritisation is covered in greater detail in the applicant's co-pending European patent application number EP94302620.3, the content of which is incorporated herein by reference. Again, the procedures are managed using C7 signalling.

For batch call requests from a utility, the TP 41 is able to scatter calls by geographic area, if necessary, to prevent call failures due to too few multi-frequency (MF) detectors in the LEs.

As already mentioned in 'Network Management View' above, the performance of the TP 41 can be monitored, and statistics taken, by the NTMS 25. Furthermore, call rates made by the TP 41 can be decreased or increased by the OMC 23 in response to increases and decreases in PSTN line demand, flagged by the NMC 21.

If required, the TP is able to initiate standard 'ring' calls over the PSTN for consumers configured to activate on a ringing call.

Utilities View

Figure 6:
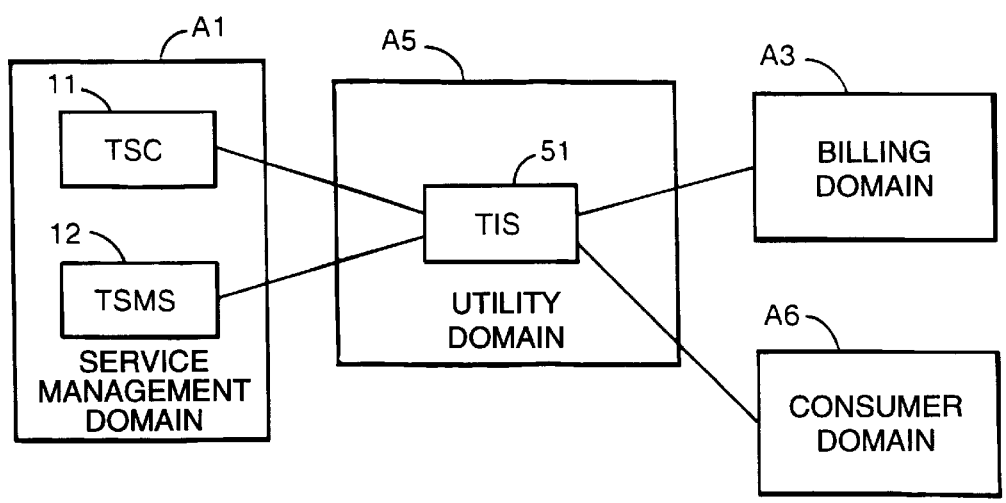

The relationships between the utility domain A5, the service management domain A1, the billing domain A3, and the consumer domain A6, are represented in FIG. 6.

The nature of the relationship between the utility domain A5 and the other domains could depend entirely on the level of automation of each utility. However, the utility is provided with a TIS 51 which includes a suitable interface which enables the telemetry system (via the TSMS 12) to deal with utilities at all levels of automation. With this interface, the utilities can use whichever legacy system they are running, without needing to upgrade. However, the applicants believe that in time all utilities will upgrade their legacy systems to be directly compatible with telemetry systems.

A TIS 51 comprises a software application running on a computer system, for example a SUN Microsystems SPARCStation 5 workstation. The workstation provides a windows, icons, menus and pointer (WIMP) desktop from within which the TIS 51 application can be selected from a menu. The TIS 51 application runs within a VT100 window within the desktop.

The TIS 51 application interface uses a character based forms application, using Oracle SQL *Forms V3. This allows the utility to access the TIS 51 system functionality and therefore the telemetry system. All telemetry functions accessible by the utility are accessed via the TIS 51, which is connected to the TSMS 12 by a communications link, which is typically an analogue PSTN line.

The TIS 51 also provides a simple interface to the legacy billing and consumer information systems of the utility. This supports simple conversion from existing information held by the utility to information which is compatible with the telemetry system.

The main functions supported by the TIS 51, in respect of telemetry operations, are:

maintenance of customer and meter information;

maintenance of meter access lists;

requests for meter consumption measurement (single tariff), on a priority ad hoc or regular basis;

interpretation of return results, and management reporting;

error handling;

meter/TIU installation and enrollment;

security;

retention of data for a number of weeks.

The TIS 51 also receives billing information from the billing domain A3, via the TSMS 12. The billing information is processed by the utility and distributed to consumers in the consumer domain A6 in the normal way.

Consumers' View

Figure 7:
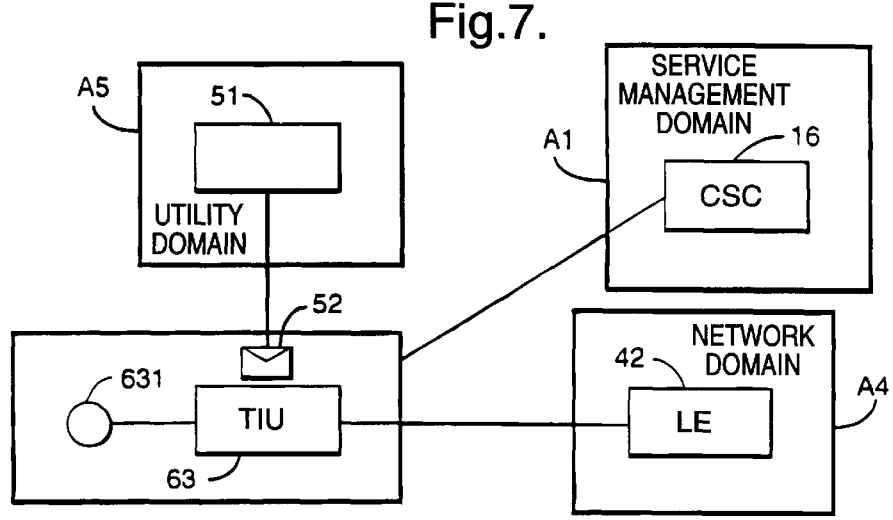

In FIG. 7, the consumers have access to the service management domain A1 to report faults or make queries, usually by telephone, although in future consumers may own suitable terminal equipment to communicate directly with the CSC 16. Also, the TIU 63, connected to a meter 631 at a consumer premises, is connected to a telephone line termination, and is accessible by the TP 41 via a LE 42 in the network domain A4. The consumers are billed by the utilities by mail 52.

Also, it is envisaged that given suitable terminal equipment attached to a TIU in the consumer premises, billing information could be forwarded directly from the utility domain A5 to consumers in the consumer domain A6 via the TSMS 12. Suitable terminal equipment would be a display device such as a printer or VDU.

Consumer Enrollment

Figure 8:
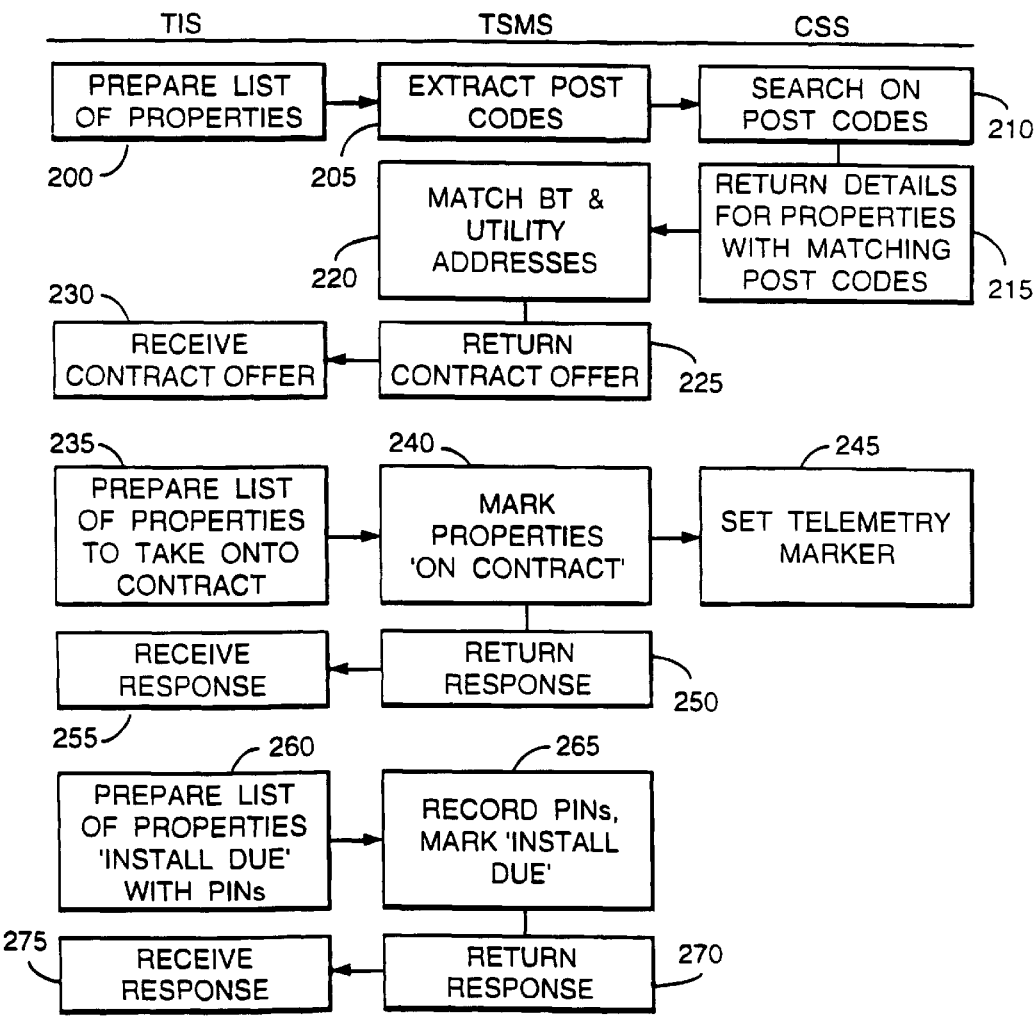
FIG. 8 is a flow diagram representing TIU and meter enrollment procedure.

The process whereby a utility enrols its consumer details with the telemetry system will now be described with reference to the processing sequence represented by FIG. 8, in which each box in the sequence is numbered to correspond with one of the following steps:

200 Prepare list of properties: the utility constructs a pre-enrollment register of consumers which are required to be enrolled with the telemetry operator. Construction occurs on the TIS 51, for example using information from the utilities' legacy billing and customer information system. The information on the TIS 51 is arranged into a format readable by the TSMS 12. The information might include, for example, the following:

customer reference;

property address;

postcode;

house number;

house name.

This information is then transmitted to the TSMS 12.

205 Extract postcodes: the TSMS 12 extracts the postcodes from the TIS 51 details and forwards the postcodes to the CSS 14.

210 Search on postcodes: the CSS 14 compares the postcodes from the lists created by the TSMS 12 with postcodes of customers which can be supported by the telemetry service. The criteria for selecting which consumers are accessible also includes whether a consumer is attached to a local exchange which can support a no-ring call (if no-ring calls are essential).

215 Return details for properties with matching postcodes: the CSS 14 returns the matching postcodes with the details of the properties to which the codes relate to the TSMS 12.

220 Match telemetry operator and utility addresses: the TSMS 12 compares the details of the properties returned by the CSS 14 with the original address information provided by the TIS 51, to provide a list of accessible consumers.

225 Return contract offer: once established, the list of accessible consumers is returned to the utility TIS 51.

230 Receive contract offer: the utility receives the list provided by the TSMS 12.

235 Prepare list of properties to take into contract: the utility again creates a register of customers from those capable of supporting the telemetry service, which list is arranged in a TSMS-readable format by the TIS 51 and is sent to the TSMS 12.

240 Mark properties 'on contract': the TSMS 12 validates and stores the list of consumers as now 'on contract'. The details of these consumers are passed to the CSS 14.

245 Set telemetry marker: a telemetry marker is set in the CSS against all consumers on a contract for the telemetry service. This will ensure that a telephone line will not be disconnected in any event, for example if a telephone bill is not paid, without first contacting the utility. In the event a telephone bill has not been paid, the consumer's ability to make a telephone call over that line may be removed whilst the ability to carry out telemetry over the line will be maintained.

250 Return response: the TSMS 12 indicates that consumer enrollment has been carried out.

255 Receive response: the TIS 51 receives the message from the TSMS 12.

Up to this point, there has been no need for there to be any equipment at the consumer's premises to support the telemetry service.

260 Prepare list of properties 'install due' with personal identification numbers (PINs): the utility creates a register of consumers who have recently or will shortly have meters and TIUs 63 installed to support the telemetry service. For each consumer selected, an installer PIN is defined. This PIN is used once a TIU 63 and meter have been installed to enrol these to the telemetry service. The list is sent to the TSMS 12.

265 Record PINs marked 'install due': the TSMS 12 receives the list and checks its own database to see if any installations have already been completed.

270 Return response: the TSMS 12 sends a list of consumer locations which already have occurred to the utility TIS 51.

275 Receive response: the TIS 51 receives the list and updates its records accordingly.

The utility is now in a position where it can request meter reads from meters which have been installed.

TIU/meter Enrollment

The physical operation of installing a TIU 63 and a meter is carried out by an installer at, or nearby, a consumer's premises. Once installed, both TIU 63 and meter need to be registered with both the telemetry service provider and the utility.

Figure 9:
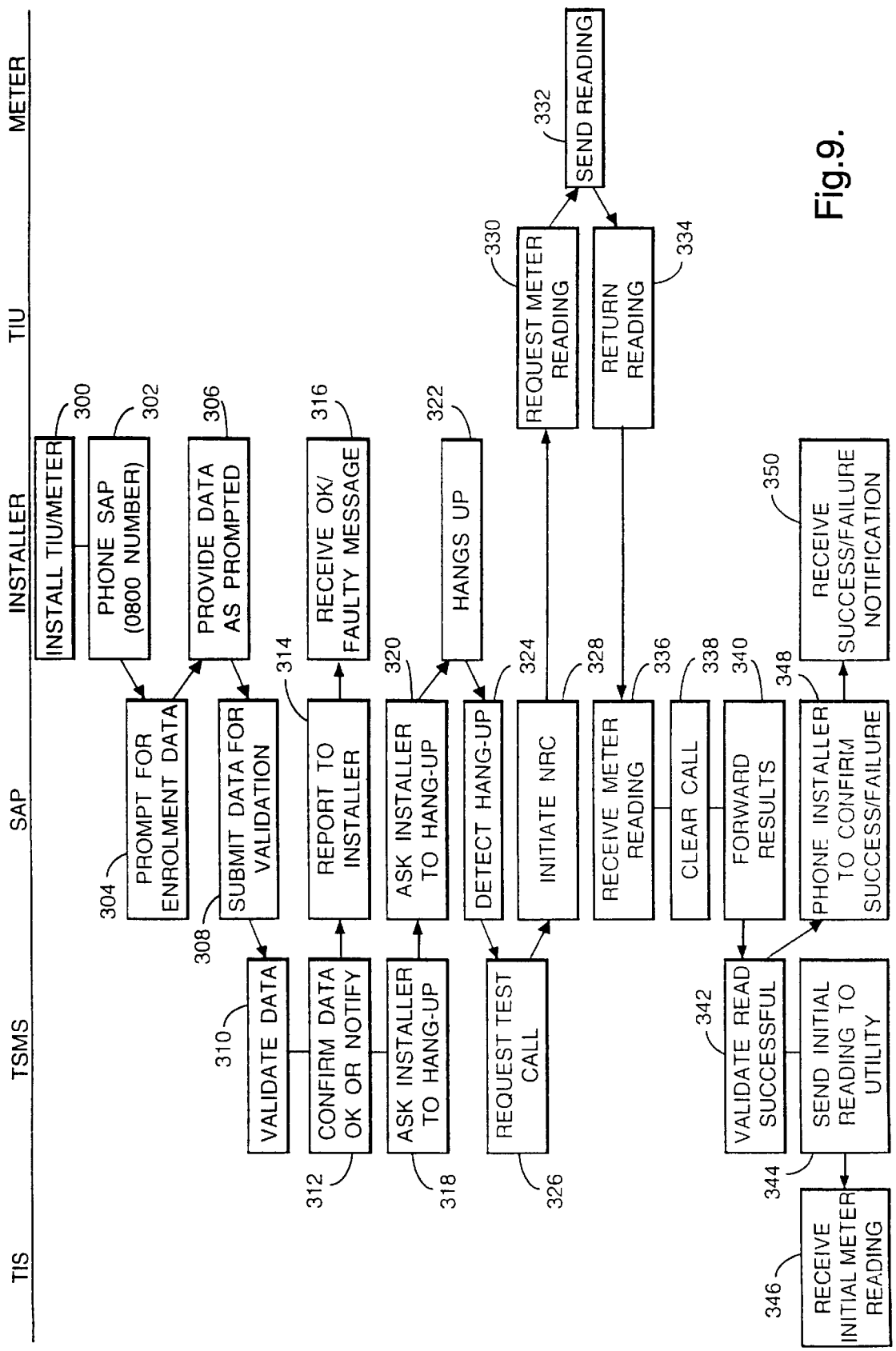
FIG. 9 is a flow diagram representing TIU and meter installation procedure.

The enrollment processing sequence will now be described with reference processing sequence in FIG. 9.

300 Install TIU/meter: the TIU 63 and meter are installed. Of course, this operation encompasses installation of further meters to the same TIU 63 or one or more meters to an existing TIU 63. Potentially, different meters and TIUs may be owned by the same, or a different, utility.

302 Phone TP: the installer makes a telephone call, for example a free-phone 0800 call, from a telephone which co-terminates the telephone line connected to the target equipment 63 on the PSTN. LE 42 receives the call request and forwards it with the CLI of the calling line to the DMSU 43, as it would with any telephony call. The DMSU 43 translates the 0800 call to the DN of the TP 41 and routes a call to the TP. The TP 41 answers the call and receives the CLI information of the caller. The CLI is the first identification of the target equipment received by the TP 41.

304 Prompt for enrollment data: in response to the call, the TP 41 prompts, using a pre-recorded voice message, for enrollment data from the installer.

306 Provide data as prompted: in response to the prompt, the installer provides the PIN which was previously identified in the consumer enrollment sequence described above. The PIN is typically provided in the form of audible MF tones from the telephone keypad.

308 Submit data for validation: the PIN data provided by the installer and the CLI are forwarded by the TP 41 to the TSMS 12.

310 Validate data: the PIN and CLI data is validated against that held on the TSMS 12 database.

312 Confirm data OK or notify: the result of the validation is sent to the installer via the TP 41.

314 Report to installer: the TP 41 forwards the message to the installer.

316 Receive OK/faulty message: the installer receives the message from the TP 41. Had the data sent by the installer been invalid, the installer at this point would be asked to re-enter the information. Further failure would result in the installer contacting the TSC 11 for technical backup.

318 Ask installer to hang up: in response to valid data, the TSMS 12 requests that the installer hangs up the telephone line.

320 Ask installer to hang up: the TP 41 forwards the request to the installer.

322 Hangs up: the installer hangs up.

324 Detect hang-up: the TP 41 detects that the installer has hung up.

326 Request test call: the TSMS 12 initiates an NRC to the TIU 63 or meter.

328 Initiate NRC: the TP 41 receives the request from the TSMS 12 and initiates the call to the TIU 63.

330 Request meter reading: the TIU 63 receives the request and indicates to the meter that a reading is required.

332 Send reading: the meter, in response, sends a reading.

334 Return reading: the TIU 63 receives the reading and returns it to the TP 41.

336 Receive reading: The TP 41 receives the meter reading.

338 Clear call: the TP 41 then clears down the call to the TIU 63.

340 Forward results: the reading is then forwarded by the TP 41 to the TSMS 12.

342 Validate read successful: the TSMS 12 validates the information and initiates the sending of a message to the installer that the reading has been made.

348 Phone installer to confirm success/failure: the TP 41 initiates a call to the installer and sends a pre-recorded announcement indicating the result of the test.

350 Receive success/failure notification: if the installation is successful, the installer will take no further action. If the test is unsuccessful, the installer may decide to retry the whole operation, or contact the TSC 11 for further assistance.

344 Send initial reading to utility: if the test read is successful, the reading is forwarded to the utility.

346 Receive initial meter reading: the utility TIS 51 receives and logs the reading.

Meter Reading

Figure 10:
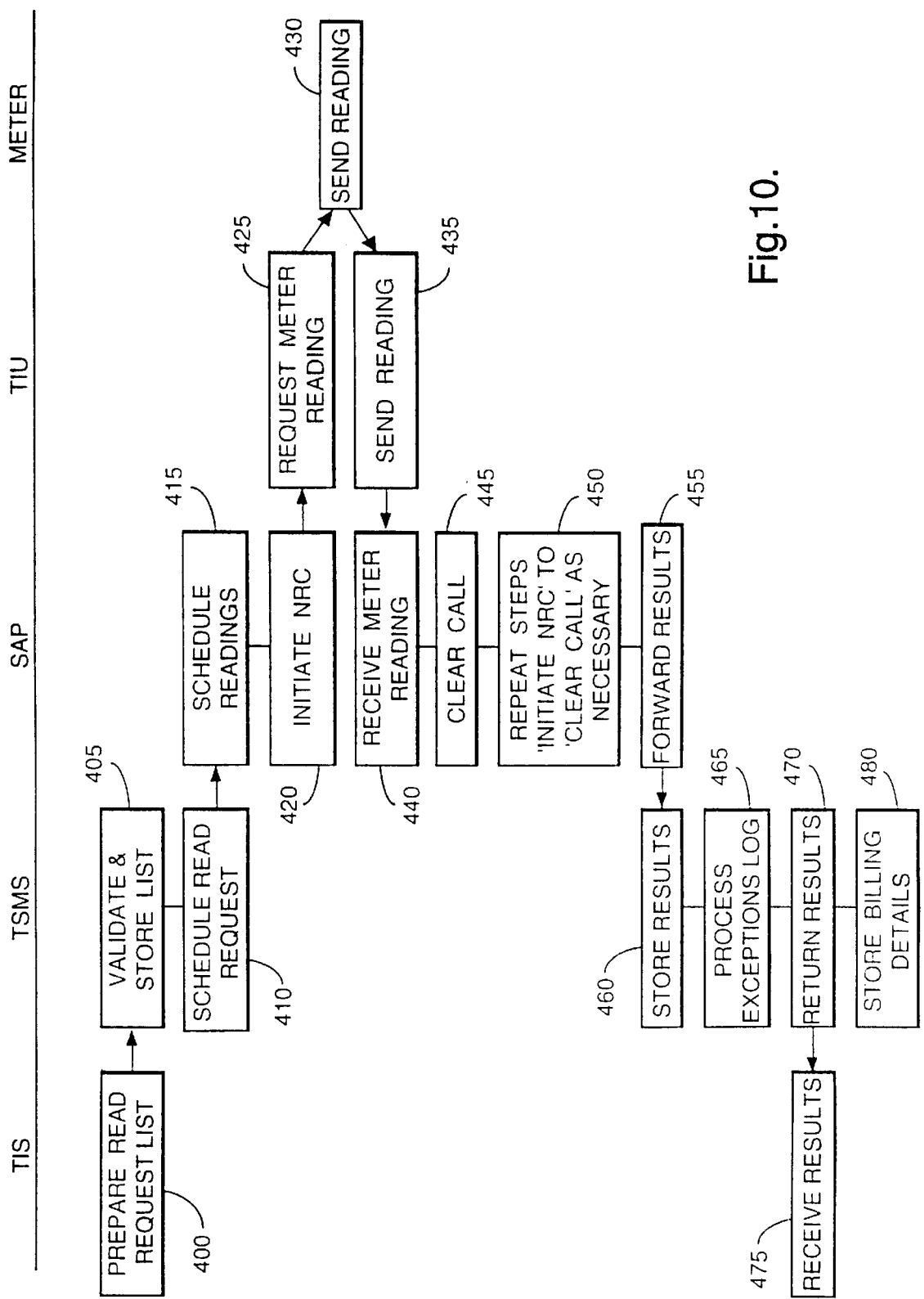
FIG. 10 is a flow diagram representing an automatic meter read process.

An example of a call flow for setting up a single or batch AMR process now be described with reference to the flow diagram in FIG. 10, in which box in the flow diagram is numbered to correspond to the following steps:

400 Prepare read request list: the utility TIS 51 identifies the meter(s) to be read, either by reference to a list, stored on a database and accessible by the TSMS 12, or by sending a list to the TSMS 12.

405 Validate and store list: the TSMS 12 checks that this utility is allowed to read the meter(s) on the list and obtains the DNs for the NRCs and the alert tones to be used from information held on the DB. The exceptions log on the TSMS 12 is updated with any invalid meter read requests.

410 Schedule read request: the list, as amended, is forwarded from the TSMS 12 to the TP 41. For a batch read, the list has a low scheduling priority so that the calls are made at the most convenient time for the network, for example at low network usage times during the night. A single read has a high scheduling priority so that it is initiated as soon as possible, for example, so that a utility making a billing enquiry can access a meter in near-real time to provide a rapid response to a consumer enquiry.

415 Schedule readings: the TP 41 schedules the start of the task.

420 Initiate NRC: for each read request in the list in turn, the TP 41 tries to set up a NRC to the TIU 63. If successful a speech path is established. If unsuccessful, a message to that effect, with a reason, is logged in an exceptions log on the TP 41. The exact details of the NRC setup and clear down are dealt with in the applicants' co-pending European patent application number EP94302756.5.

425 Request meter reading: The TIU 63 validates the TIU ID and port number received from the TP 41 request. If valid, the TIU 63 requests a reading from the meter (in some cases the TIU 63 holds the meter reading eg. pulsed metering in which the TIU 63 reads the meter periodically).

430 Send reading 1: the meter sends the meter reading to the TIU 63 (if not pulsed metering).

435 Send reading 2: If the TIU ID and port number are valid, then the TIU 63 checks the reading received from the meter, and if valid, sends the meter reading to the TP 41; otherwise it send a failure reason code.

440 Receive meter reading: the TP 41 checks and records the received reading in a valid readings log, or updates the exceptions log with any failure reason code, and re-schedules a call dependent on the failure code (eg. if line engaged).

445 Call clearing: the TP 41 requests the DMSU 43 to clear the call. The DMSU 43 passes the request to the LE 42 which clears the call. The LE 42 returns a message to the TP 41 that the call is cleared.

450 Repeat 'initiate NRC' to 'clear call" as necessary: the TP 41 attempts a NRC for the next request in the list, if there is one.

455 Forward results: valid readings log and exceptions log are forwarded to the TSMS 12 periodically, to update the logs held on the TSMS 12.

460 Store results: the results of the read are stored by the TSMS 12.

465 Process exceptions log: problems which can be dealt with are sent to the TSC 11, others are referred back to the utility.

470 Return results: the valid readings log and the exceptions log are returned to the utility TIS 51, which uses the information for consumer billing purposes.

475 Store billing details: billing information is derived from the valid readings and exceptions logs by the TSMS 12, and billing information is returned to the billing domain via the TSC 11. Bills for telemetry are then forwarded periodically to utility.

Meter Broadcast

Figure 11:
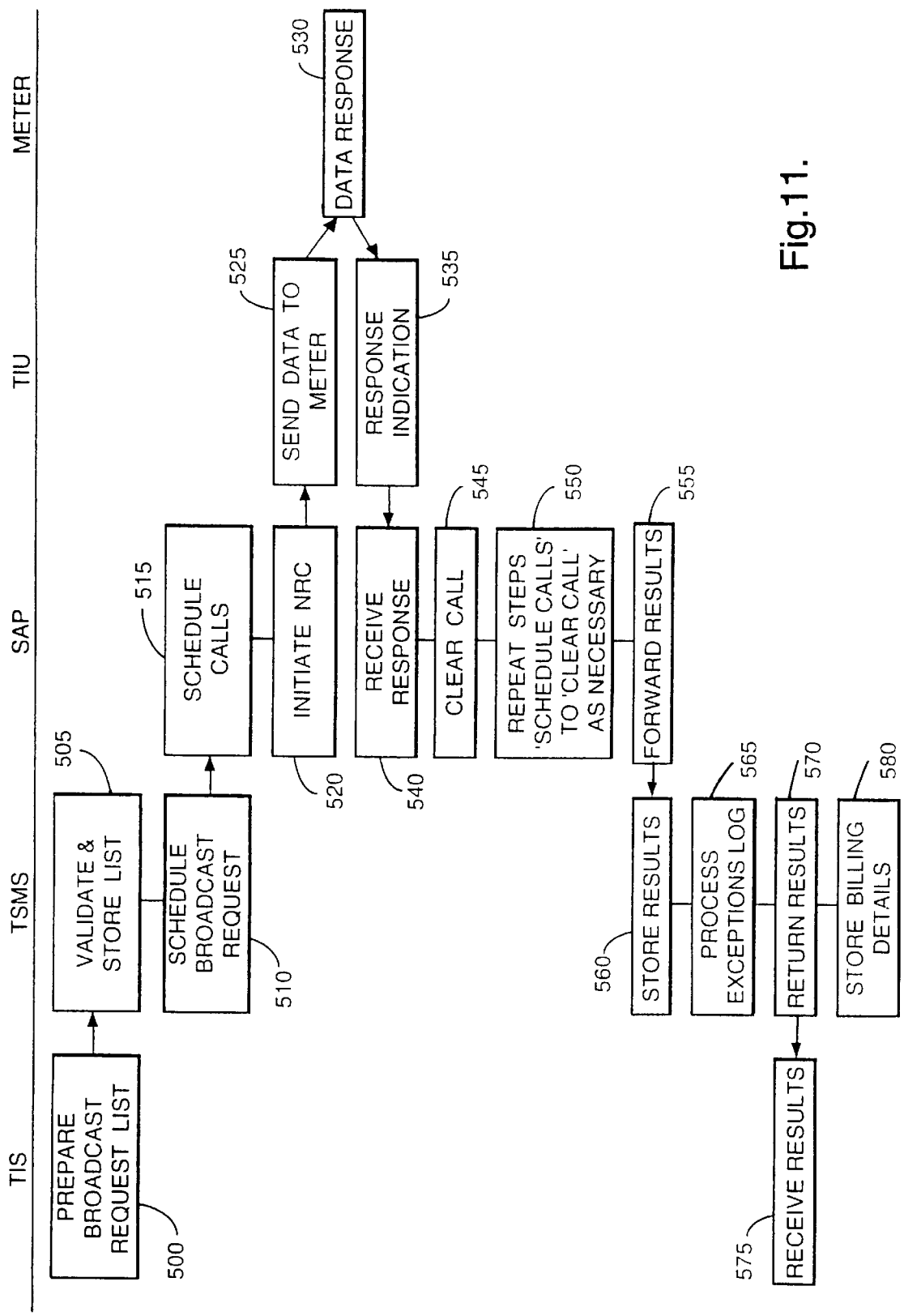
FIG. 11 is a flow diagram representing a multiple meter broadcast process.

The process whereby the same information is broadcast to one or more of consumer meters is explained with reference to FIG. 11. A broadcast function is required so that certain desirable features of a telemetry service can be supported. Features include, for example, automatic modification of the value of one unit of measure on a number of meters in response to a change in the cost of supply (eg 1 unit of water may change from 100 liters to 85 liters). A broadcast function may also form the basis whereby remote control of equipment, for example central heating systems and the like, can be achieved, although strictly speaking this would not be 'broadcast'. For remote control, instead of sending meter updating information to multiple pieces of equipment, appropriate controlling information is sent to a single controller in a consumer's premises connected to the PSTN, the controller being responsive to the information to control the heating level, for example. Of course, the broadcast function would also form the basis for consumer billing, as described above. The boxes in FIG. 11 are numbered to correspond to the following descriptions of the steps:

500 Prepare broadcast request list: the utility TIS 51 identifies the meter(s) to be broadcast to, either by reference to a list, stored on a database and accessible by the TSMS 12, or by sending a list to the TSMS 12.

505 Validate and store list: the TSMS 12 checks that this utility is allowed to broadcast to the meter(s) on the list and obtains the DNs for the NRCs and the alert tones to be used from information held on the DB 15. The exceptions log on the TSMS 12 is updated with invalid meter broadcast requests.

510 Schedule broadcast request: the list, as amended, is forwarded from the TSMS 12 to the TP 41. For a batch broadcast, the list has a low scheduling priority so that the calls are made at the most convenient time for the network, for example at low network usage times during the night. A single broadcast has a high scheduling priority so that it is initiated as soon as possible, for example, when a consumer pays an overdue bill, the meter needs to be credited immediately if re-connection of a consumer's supply is required.

515 Schedule calls: the TP 41 schedules the start of the task.

520 Initiate NRC: for each broadcast request in the list in turn, the TP 41 tries to set up a NRC to the TIU 63. If successful a speech path is established. If unsuccessful, a message to that effect, with a reason, is logged in an exceptions log on the TP 41. The exact details of the NRC setup and clear down are dealt with in the applicants' co-pending European patent application number EP94302756.5.

525 Send data to meter: the TIU 63 validates the TIU ID and port number received in the call from the TP 41, and if valid, checks the received data. If the data is valid, the TIU 163 downloads the data to the meter.

530 Data response: the meter responds to the received data.

535 Response indication: the TIU 63 indicates the response from the meter to the TP 41. If the download is unsuccessful, a failure message is sent to the TP 41 with a reason code, which updates the TP's exceptions log. If the download is successful, the meter sends a corresponding report to the TIU 63, which is forwarded to the TP 41.

540 Receive response: the TP checks and records responses in either its valid download log (corresponds to a valid readings log) or its exceptions log, and re-schedules a failed call dependent on the failure code (eg if line engaged).

545 Call clearing: the TP 41 requests that the DMSU 43 clears the call. The request is forwarded to the LE 42 to clear the call. The LE 42 sends a response of call cleared back to the TP 41.

550 Repeat steps 'schedule calls' to 'clean call' as necessary: the next request on the list, if any, if processed.

555 Forward results: the TP's valid download log and the exceptions log are forwarded to update the logs on the TSMS 12.

560 Store results: the TSMS 12 stores the received results in the DB 15.

565 Process exceptions log: problems which can be dealt with are dealt with by the TSC 11, others are referred back to the utility.

570 Return results: the data download log and the exceptions log are returned to the utility computer.

575 Receive results: the utility TIS 51 receives the results.

580 Store billing details: billing information is derived from the valid download log and the exceptions log by the TSMS 12, and billing information is returned to the billing domain via the TSC 11, which information is used to bill the utility.

Interface between TP and TIU

Support for meter-specific or TIU 63 specific functions is handled using a general purpose communications protocol between the TP 41 and the TIU 63. The protocol supports the use of 'templates'. In this context, a template is a data structure comprising fixed and replaceable parameters. The fixed parameters comprise information required to tell the TP 41 how to communicate with a certain type of meter/TIU combination (eg baud rate of TIU, login sequence and shutdown sequence). The replaceable parameters comprise identifiers which correspond to information required to allow the TP 41 to connect to a specific meter of the specified type at a specific consumer premises (eg TIU port number and meter authentication code). Replaceable parameters may also define the type of operation required, for example meter read operations or broadcast to meter operations.

The use of templates greatly enhances the flexibility of the remote access systems to access different types of target equipment, since information relating to all known types of target equipment is maintained by the TSMS 12 and can be passed as required with all requests to the TP 41.

A basic TIU 63 is line powered, and has a fairly low modem speed (1200 bit/s). However, once a call is established, typically there is a transparent connection between the remote access system and the TIU 63, and data transfer rates can therefore be chosen for maximum efficiency. TIUs 63 can have various levels of functionality and use modems of various speeds. Basic TiUs 63 can be made very cheaply with the provision for more elaborate design for high-usage sites.

However, all sites will still use the same basic communications infrastructure.

Conveniently, the remote access system supports communications to as many types of equipment as possible.

Initially, in telemetry, the focus is likely to be communications with utility meters. Standard protocols are used where they exist, in particular IEC1107 (FLAG), and any software which enables translation between different protocols (eg CHIRPS). However, in time, the Applicants believe that universal telemetry standards will be established.

Templates are stored as ASCII-formatted data files in memory on, or associated with, the TP 41 (an example template is shown in Table 3). A template exists for each TIU/meter combination supported by the telemetry system. A template is chosen on a per call basis by the TP 41, according to meter type, TIU 63 type and command type supplied with the call request by the TSMS 12. The call request also includes the replaceable parameter values to be combined with the fixed parameter information in the template which in combination form a complete data record necessary to carry out an AMR or other operation with a specific TIU 63 and meter.

A simple AMR operation will now be described.

In a template, parameters have various types according to Table 1.

TABLE 1

| Character | Parameter Data Type (PDT) generated |
|---|---|
| t | TIU control |
| l | Logical value |
| c | Command |
| n | Numeric character |
| s | String |
| v | Pseudo variable |
| b | Binary data |
| f | Flag data |

Other parameter types may exist, but these are the main types. Parameter types closely resemble those found in general purpose computer programming languages, for example the C programming language. Parameter types are recognised by data interpreters associated with both the TP 41 and the TIU 63, which interpret each character in turn on receipt of a data record.

Table 2 lists all the replaceable parameter types which have been defined for this example.

TABLE 2

| Character | Meaning | Source of variable | Parameter data type inserted |
|---|---|---|---|
| I | TIU ID | From TSMS | TIU control |
| k | Key string used for authenticating TIU using a challenge/response sequence | Internally generated by TP | TIU control |
| p | Port number to be used by subsequent operations | From TSMS | numeric characters |
| t | The current time in the following format YYYYMMDDhhmmss | From TP internal clock | numeric characters |
| Any digit (0–9) | A user-defined parameter. The digit gives the relative position of a parameter defined in WRITE_DATA | From TSMS | as defined in WRITE_DATA |
| Any upper case character (A–Z) | A user-defined parameter. The character gives the relative position of a parameter in WRITE_DATA | From TSMS | as defined in WRITE_DATA |

Table 3 illustrates an example template which would be stored on the TP for a specific TIU/meter combination. A "%" followed by an alphanumeric character indicates a replaceable parameter.

TABLE 3

| Template Records | Meaning | Parameter Block No. |
|---|---|---|
| I%i | Send supplied TIU ID | 0 |
| K%k | Send challenge/response key | 1 |
| P%p | Send supplied TIU port number | 2 |
| B(n)2 | Set baud rate to 1200 | 3 |
| /(n)2 | Execute login macro 2 | 4 |
| W%1 | Write second parameter in WRITE_DATA | 5 |
| R(v)t | Read data from meter | 6 |
| Z%t | Send shutdown command with current time | 7 |

When the TSMS 12 makes a call request to the TP 41, the call request includes what is known as a WRITE_DATA block, which holds all the information used for replaceable parameters. %0 is taken to be the first parameter in the block, %1 the second, %A is the eleventh and %Z is the thirty-sixth parameter in the block. Each parameter can be referenced zero or more times in the template. Each parameter comprises a parameter data type, a data length indicator and the data itself. When the result of the AMR has been received by the TP, the result is returned to the TSMS 12 in what is known as a READ_DATA block of the record passed back to the TSMS 12.

For the purposes of this example, the following replaceable parameter values will be assumed:

%l=AB12
%k=Secret
%p=3
%t=19940721103056
%1=0x600x03AZ1

The combination by the TP 41 of the template with these replaceable parameters from the TSMS 12 call request leads to the sequence of data shown in Table 4 being sent to the TIU 63 by the TP 41.

TABLE 4

| Byte | Meaning |
|---|---|
| I | TIU ID |
| 0 × 20 | 4MSB=PDT=Type=TIU control |
| 0 × 04 | Length=4 |
| A | TIU ID |
| B | |
| 1 | |
| 2 | |
| K | Challenge/Response |
| 0 × 20 | 4MSB=PDT=Type=TIU Control |
| 0 × 06 | Length=6 |

TABLE 4-continued

| Byte | Meaning |
|---|---|
| S e c r e t | The key |
| P | Port |
| 0 × 50 | 4MSB=PDT=Type=Numeric |
| 0 × 01 | Length=1 |
| 3 | The port number |
| B | Baud rate |
| 0 × 50 | 4MSB=PDT=Type=Numeric |
| 0 × 01 | Length 1 |
| 2 | 1200 Baud |
| / | Login macro |
| 0 × 50 | 4MSB=PDT=Type=Numeric |
| 0 × 01 | Length 1 |
| 2 | Macro 2 |
| W | Write data |
| 0 × 60 | 4MSB=PDT=Type=String |
| 0 × 03 | Length 1 |
| A Z 1 | Write data from user parameter |
| R | Read |
| 0 × 40 | 4MSB=PDT=Type=Command |
| 0 × 01 | Length 1 |
| t | Read meter and transmit |
| Z | Shutdown |
| 0 × 50 | 4MSB=PDT=Type=Numeric |
| 0 × 0F | Length 15 |
| 1 9 9 4 0 7 2 1 | Date 21/07/94 |
| 1 0 3 0 5 6 | Time 10:30:56 |

Table 4

In practice, the record illustrated in Table 4 would also contain standard protocol information used for communication management purposes. The information would include a message header which is recognised by the TIU 63, which header would indicate the start of the record to the TIU 63 and would include an indication of the length of the whole record, and checksum information to ensure that data has been transmitted without error.

The information in the data record is compiled by the TP 41 in response to a call request. The record is then transmitted to the TIU 63 and a reply is awaited up to a maximum time-out of 5 seconds. A time-out would result in one or more re-tries by the TP 41, followed by an entry by the TP 41 into an exception log to the effect a failure has occurred. Data transmission is supported by a standard transmission protocol supported by the TP 41 and the TIU 63, for example the V.23 protocol.

When the TIU 63 replies to the message from the TP 41, the information is validated and the meter information is returned to the originator via the READ_DATA field in the record passed back to the TSMS 12.

An example of an information record returned by the TIU 63 to the TP 41 is illustrated in Table 5.

TABLE 5

| Byte(s) | Meaning |
|---|---|
| 0 × 01 | Response to K parameter |
| 0 × 20 | 4MSB=PDT=Type=TIU Control |
| 0 × 04 | Length 4 |
| Q Z Q X | Response |
| 0 × 06 | Response to R parameter |
| 0 × 60 | 4MSB=PDT=Type=String |
| 0 × 06 | Length 6 |
| 8 9 6 5 4 3 | Meter reading |

The response to the "K" command is verified using an internal challenge/response function in the TP 41. The response to the "R" command, a read data string, is returned to the originator via the TSMS 12, in the READ_DATA block. The block holds the value 896543. As the skilled person will appreciate, the above example does not include communication management data, for example header and checksum information. However, this information would be included in practice, and would conform to a known standard, for example X.25.

Interface between TIS 51 and TSMS 12

The link between the TIS 51 and TSMS 12 is based on the TCP/IP protocol. Each message is encapsulated within a file which is transferred over TCP/IP using a file transfer program (ftp). The actual medium of the connection is a dial-up link which is dependent on a utility's requirements, such as X.25, PSTN or ISDN.

TIU Initiated Calls

Hitherto in this description, all calls have been initiated by the TSMS 12 via the TP 41 to a TIU 63 and meter. As has already been mentioned, in some embodiments it is preferable for the TIU or meter (or other target equipment) to be able to initiate calls.

Figure 12:
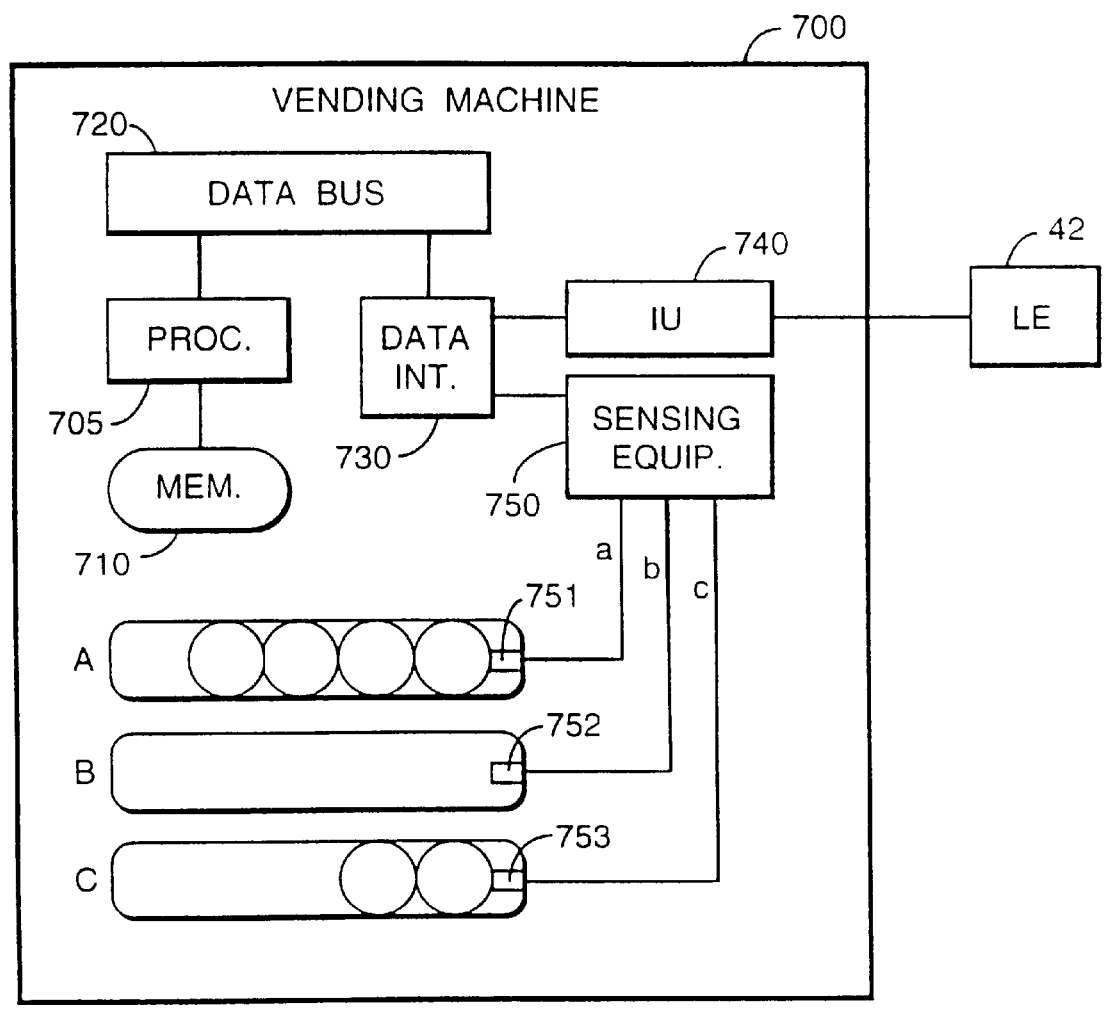
FIG. 12 is a diagram which illustrates features of the present invention applied to a vending machine.

FIG. 12 represents the equipment required for a vending machine, containing three possible products A, B and C, which has the facility to report that one or more of the products has run out. This arrangement would be applicable to other scenarios such as, for example, a fuel tank or a refrigeration plant.

In FIG. 12, a vending machine 700 includes a microprocessor 705 for controlling the reporting process. A suitable micro-processor is an Intel 80286 processor running an operating system and software suitable for control and communication applications. The software is stored in a main memory 710 accessible by the processor 705. Software for controlling the communications operations is also stored in the main memory 710. The processor 705 has a data bus 720 via which all data external to the processor can be transmitted or received. The data bus 720 is connected to a data interface 730. The data interface 730 has two further connections of which one connection is to an interface unit 740 (IU) which comprises a modem (not shown). The interface unit 740 is equivalent in operation to a TIU 63. The IU 740 is connected via a telephone line, or other suitable communications link, to a LE 42. Standard communications software, for example the Procomm script language, can be arranged to support all communications between the equipment and the outside world using, for example, a Hayes compatible modem.

The other connection from the data interface 730 is to sensing equipment 750 for sensing, via sensing lines a, b and c, whether products A, B or C have run out or are depleted beyond an acceptable product-low threshold. The sensing equipment 750 comprises digital circuitry to convert an electrical signal received from one of the sensing lines into a coded signal representative of the signalling line. The coded signal is sent to the processor 705 running the control software.

In the example in FIG. 12, sensors 751, 752 and 753 detect when the products run out. The sensors could be pressure sensitive or light sensitive, or they could be sensitive to any other variable condition which might change when a product runs out.

In the example of a remote fuel storage tank, which is able to indicate to its owner that the tank is nearly empty, the sensor would comprise a fuel level indicator, for example a float attached to a digital switch. When the fuel level drops sufficiently, the float switches the polarity of the switch, which in turn indicates (using simple logic circuitry) to the sensing equipment 750 that a call needs to be made to the tank's owner. A similar arrangement could be used to sense when no products, for example cans of drink, are in a storage area within the vending machine.

The procedure for establishing a call initiated by the vending machine 700 is as follows. Product B runs out, the sensor 752 sends, via the line b, a signal to the sensing equipment 750 which, in turn, sends a signal, indicating that the signal was sent by the sensor 752 for Product B, to the processor 705.

Next, the processor 705 recognises the signal from the sensing equipment 750 and initiates a call to establish a communications channel with, for example, the TP 41 of the remote access system described above. The actual procedure for setting up the communications channel is the same as the step 302 in the procedure described for TIU/Meter Enrollment and therefore will not be repeated here.

Once the call has been made and the communications channel is established, data can be transmitted from the IU 740 to the TSMS 12 via the TP 41. Data transmission follows the scheme described above in which the data from the IU 740 is transmitted in the READ-DATA block to the TSMS 12. The TSMS 12 sends the information to the TIS 51 owned by the vending machine owner. The TSMS 12 initiates a specific call to the TIS 51 to enable the sending of the data to the owner. Alternatively, the owner might own many vending machines and prefer to receive information from all vending machines at the same time. In this case the TIS 51 or the owner could initiate one call each day to receive a batch of information.

In different situations, for example during on-going vandalism of target equipment, rapid communication of information to parties other than the target equipment owner might be desirable. The TSMS 12 or the TP 41 could be configured to contact the police automatically in response to a call from the target equipment indicating vandalism of the target equipment is taking place. The READ_DATA block would then hold a pre-defined message indicating to the police the whereabouts of the target equipment and the nature of the offence. Obviously, in this example the police would need a suitable interface, similar to a TIS, to receive such information.

Probably, commercial remote equipment such as a vending machine, which can initiate calls to the TSMS, will not co-terminate a communications line with other communications equipment, for example a telephone, in the same way a utility meter might. Therefore, for the purposes of enrollment, the processor in the equipment will need to be pre-programmed with suitable software to carry out the dialogue which would otherwise be carried out by the installer. Such a dialogue can be controlled very simply with commercially available software, for example the Procomm script language, however it is envisaged that dedicated software would be provided for this task.

Specific enrollment processes will be developed by consultation with manufacturers of the target equipment. In another scenario, a refrigeration plant might fail, jeopardising large quantities of frozen food. In this case, target equipment sensitive to ambient temperature changes in the refrigeration plant could initiate a call to the TP 41. The TSMS 12 or the TP 41 could then initiate a call to an engineer, for example by radio pager via a radio pager network, where the READ_DATA block would contain a pre-defined message and location of the plant.

Many other uses of single or bi-directional remote access operations will become apparent to the skilled person in view of the preceding description. All such operations remain in keeping with the present teaching and accordingly are intended to come within the scope of the present invention.

What is claimed is:

1. A remote access management system for managing communication with distributed target equipment over a communications network, said system comprising:

means for receiving a request for an access operation to selected target equipment;

means for providing routing information for target equipment identified by said request, said routing information including, for each of at least some pieces of target equipment, a communication network line termination address and a port number of an interface means having a plurality of ports, each of said at least some pieces of target equipment being connected to the network via a port of an interface means and being thereby individually accessible by specifying a respective interface address and a respective port number in the routing information;

means for providing equipment-specific access requirements in dependence upon the type of the selected target equipment;

means for initiating an access operation to said target equipment, said means including means arranged to transmit control information, including said routing information and said equipment access requirements, to a communications network platform arranged to receive said control information and operate said access operation over a communications network;

means for receiving and storing data from said network platform in response to said access operation; and, means for forwarding to the originator of said request data indicative of said stored data.

2. A remote access management system according to claim 1, arranged to provide routing information for distributed target equipment connected to a public switched telephone network.

3. A remote access management system according to claim 1, wherein the control information determines whether the communication is substantially a read operation or substantially a write operation.

4. A remote access management system according to claim 1, comprising means for validating said request, said request including data identifying the originator of the request and said means including means to compare the identity of the request originator with a stored set of valid request originators.

5. A remote access management system according to claim 1, comprising validation means arranged to check whether the target equipment specified in the request is validly accessible by an originator.

6. A remote access management system according to claim 1, including a set of unique references stored in relation to the system, each of said references corresponding to a pre-determined list of one or more pieces of target equipment, wherein a valid request includes at least one reference matching one of the references of said stored list.

7. A remote access management system according to claim 1, comprising timed trigger means for triggering the initiating means to initiate calls to target equipment at pre-selected intervals or times.

8. A remote access management system according to claim 1, arranged to receive a request and initiate one or more calls determined by the request immediately.

9. A remote access management system according to claim 1, comprising up-datable database means containing information including network addresses of all potential target connections accessible over the communications network and the physical locations of said network connections.

10. A remote access system for communicating with distributed target equipment over a communications network, said system comprising a remote access management system as in claim 1 and a communications network platform comprising:

means to receive control information, including said target equipment routing information, from said remote access management system;

means to control access of said target equipment and to receive data, in response to said access, from said target equipment; and means to return at least some of said received data to said remote access management system.

11. A remote access system for communicating with distributed target equipment over a communications network, said system comprising:

a remote access management system as in claim 1; and a communications network platform comprising:

means to receive control information, including said target equipment routing information, from said remote access management system;

means to control access of said target equipment and to receive data, in response to said access, from said target equipment;

means to return at least some of said received data to said remote access management system; and priority determining means for determining whether an access initiated by the initiating means takes precedence with respect to traffic on the network which is independent of the remote access system in the event of potential conflict in the network.

12. A remote access system according to claim 11, wherein the priority determining means, in use, determines that said traffic on the network takes precedence.

13. A remote access system according to claim 11, wherein the priority determining means, in use, determines that calls initiated by the initiating means take precedence.

14. A remote access system according to claim 1, comprising means to initiate a no-ring call, whereby for target equipment co-terminating a line of the communications network with other communications apparatus access to the target equipment in preference to said other communications apparatus is achieved using a no-ring call.

15. A remote access system according to claim 1, wherein no-ring calls are established using C7 signalling.

16. A remote access system according to claim 1, comprising means for billing request originators.

17. A remote access system according to claim 1, wherein the billing means is arranged to bill request originators on a per target equipment access basis.

18. A remote access system according to claim 1, comprising means for converting customer request information not readable by the means for receiving requests into readable customer request information.

19. A remote access management system for controlling communications between customers and distributed target equipment over a communications network, said system comprising:

means for managing communications with a customer;

means for managing communications with communications equipment in the communications network, whereby communications with target equipment can be managed;

means for storing data received from either the customer or the communications equipment; and means for forwarding data representative to data stored by said means for storing to either said customer or said communications equipment.

20. A remote access management system according to claim 19, wherein the remote access management system is arranged to receive data from said communications equipment, store said data, and forward data representative of said stored data to a customer.

21. A remote access management system according to claim 1 arranged such that remote access may be initiated by target equipment instead of, or as well as, by the customer.

22. A remote access management system according to claim 19, arranged to receive information from target equipment, the target equipment having initiated a call to said system.

23. A remote access management system according to claim 22, wherein the target equipment comprises at least one vending machine.

24. A remote access management system according to claim 22, comprising means arranged to initiate a call to a party other than the customer and transfer information relating to the received information to the party.

25. A remote access management method for managing communication with distributed target equipment over a communications network, said method comprising:

receiving a request for an access operation to selected target equipment;

providing routing information for target equipment identified by said request, said routing information including, for each of at least some pieces of target equipment, a communication network line termination address and a port number of an interface means having a plurality of ports, each of said at least some pieces of target equipment being connected to the network via a port of an interface means and being thereby individually accessible by specifying a respective interface address and a respective port number in the routing information;

providing equipment-specific access requirements in dependence upon the type of the selected target equipment;

initiating an access operation to said target equipment by transmitting control information, including said routing information and said equipment access requirements, to a communications network platform arranged to receive said control information and operate said access operation over a communications network;

receiving and storing data from said network platform in response to said access operation; and forwarding to the originator of said request data indicative of said stored data.

26. A remote access management method as in claim 25 which provides routing information for distributed target equipment connected to a public switched telephone network.

27. A remote access management method as in claim 1 wherein the control information determines whether the communication is substantially a read operation or substantially a write operation.

28. A remote access management method as in claim 1 including validating said request including data identifying the originator of the request and comparing the identity of the request originator with a stored set of valid request originators.

29. A remote access management method as in claim 1 including checking whether the target equipment specified in the request is validly accessible by an originator.

30. A remote access management method as in claim 1 including a set of unique references stored in relation to the system, each of said references corresponding to a predetermined list of one or more pieces of target equipment, wherein a valid request includes at least one reference matching one of the references of said stored list.

31. A remote access management method as in claim 1 including triggering the initiating step to initiate calls to target equipment at pre-selected intervals or times.

32. A remote access management method as in claim 1 which receives a request and initiates one or more calls determined by the request immediately.

33. A remote access management method as in claim 1 including an up-datable database containing information including network addresses of all potential target connections accessible over the communications network and the physical locations of said network connections.

34. A remote access method for communicating with distributed target equipment over a communications network, said method comprising:

a remote access management method as in claim 25 and a communications network platform which:

receives control information, including said target equipment routing information, from said remote access management method;

controls access of said target equipment and receives data, in response to said access, from said target equipment; and returns at least some of said received data to said remote access management method.

35. A remote access method as in claim 34 further comprising:

determining whether an access initiated by the initiating step takes precedence with respect to traffic on the network which is independent of the remote access method in the event of potential conflict in the network.

36. A remote access method as in claim 35 wherein the priority determining step, in use, determines that said traffic on the network takes precedence.

37. A remote access method as in claim 35 wherein the priority determining step, in use, determines that calls initiated by the initiating step take precedence.

38. A remote access method as in claim 34 includes:

initiating a no-ring call, whereby for target equipment co-terminating a line of the communications network with other communications apparatus access to the target equipment in preference to said other communications apparatus is achieved using a no-ring call.

39. A remote access method as in claim 38 wherein no-ring calls are established using C7 signaling.

40. A remote access method as in claim 34 including the billing of request originators.

41. A remote access method as in claim 40 wherein the billing step is arranged to bill request originators on a per target equipment access basis.

42. A remote access method as in claim 34 including:

converting customer request information not readable by the receiving requests step into readable customer request information.

43. A remote access management method for controlling communications between customers and distributed target equipment over a communications network, said method comprising:

managing communications with a customer;

managing communications with communications equipment in the communications network, whereby communications with target equipment can be managed;

storing data received from either the customer or the communications equipment; and forwarding data representative to data stored by said means for storing to either said customer or said communications equipment.

44. A remote access management method as in claim 43 wherein the remote access management method receives data from said communications equipment, stores said data, and forwards data representative of said stored data to a customer.

45. A remote access management method as in claim 43 wherein remote access may be initiated by target equipment instead of, or as well as, by the customer.

46. A remote access management method as in claim 43 arranged to receive information from target equipment, the target equipment having initiated an incoming call.

47. A remote access management method as in claim 46 wherein the target equipment comprises at least one vending machine.

48. A remote access management method as in claim 46 wherein a call is initiated to a party other than the customer and transfer information relating to the received information to the party.

* * * * *